United States Patent

Kojima et al.

[11] Patent Number: 5,886,999
[45] Date of Patent: Mar. 23, 1999

[54] RECEIVING APPARATUS AND METHOD OF OUTPUTTING RECEIVED SIGNAL IN MULTIMEDIA COMMUNICATION

[75] Inventors: Jun Kojima; Mitsuru Seta; Tomoyuki Ueno, all of Kawasaki, Japan

[73] Assignee: Fujitsu Limited, Kanagawa, Japan

[21] Appl. No.: 695,670

[22] Filed: Aug. 8, 1996

Related U.S. Application Data

[63] Continuation of Ser. No. 302,974, Sep. 12, 1994, abandoned.

[30] Foreign Application Priority Data

Feb. 28, 1994 [JP] Japan .................................. 6-029357

[51] Int. Cl.$^6$ .................................................. G06F 11/00
[52] U.S. Cl. ............................. 371/5.5; 371/2.1; 371/30
[58] Field of Search ........................... 371/5.5, 5.6, 5.1, 371/47.1, 20.1, 20.3, 20.6, 30, 2.1; 370/13, 14, 15, 16, 17, 53

[56] References Cited

U.S. PATENT DOCUMENTS

| | | | |
|---|---|---|---|
| 3,534,264 | 10/1970 | Blasbalg et al. | 371/5.5 |
| 3,582,879 | 6/1971 | Sullivan | 371/30 |
| 4,567,591 | 1/1986 | Gray et al. | 370/376 |
| 4,961,190 | 10/1990 | Nakajima | 371/8.2 |
| 5,418,815 | 5/1995 | Ishikawa et al. | 375/216 |
| 5,430,746 | 7/1995 | Renz | 371/47.1 |

*Primary Examiner*—Phung M. Chung
*Attorney, Agent, or Firm*—Armstrong, Westerman, Hattori, McLeland, & Naughton

[57] ABSTRACT

A demultiplexer separates the data obtained by the demodulation into the data for each information medium, and a synchronous word detection state monitor detects the synchronous word contained in a received signal of a predetermined information medium and compares the state in which said synchronous word is detected with the preset standard, and outputs an output stop signal when the synchronous word detection state is worse then the preset standard.

An error-correction decoder subjects the data obtained by the demodulation to an error-correction decoding processing, and an error-correction encoder subjects the decoded data to an error-correction encoding processing. A line quality estimating portion estimates the quality of the line by comparing the data obtained by the error-correction encoding processing with the demodulated data before decoding and an output controller stops outputting the received signal to the external terminal when the line quality is worse than the reference quality.

2 Claims, 13 Drawing Sheets

RECEIVING APPARATUS AND METHOD OF OUTPUTTING RECEIVED SIGNAL IN MULTIMEDIA COMMUNICATION

This application is a continuation of application Ser. No. 08/302,974 filed Sep. 12, 1994, now abandoned.

BACKGROUND OF THE INVENTION

1. Field of the Invention

The present invention relates to a receiving apparatus and a method of outputting a received signal in multimedia communication, more particularly, to a receiving apparatus and a method of outputting a received signal in multimedia communication in which a transmitting apparatus multiplexes plural kinds of information such as a video signal, an audio signal, etc. and transmits the multiplexed information through a communication line, and in which a receiving apparatus separates the multiplexed information and outputs the separated information to predetermined external terminals.

2. Description of the Related Art

FIG. 11 schematically shows the principle of a multimedia broadcast communication system using a satellite transponder. In FIG. 11, the reference numeral 1 represents a transmitting station, $2_1$, $2_2$, . . . receiving stations and 3 a satellite transponder. In the transmitting station 1, the reference numeral 1a represents a video transmitter, 1b an audio transmitter, 1c a time division multiplexer, 1d a transmitter and 1e a transmission antenna. The video transmitter 1a inputs digital video data with a forward error correction code (FEC) attached thereto to the time division multiplexer 1c, and the audio transmitter 1b inputs digital audio data with an FEC attached thereto to the time division multiplexer 1c. The time division multiplexer 1c multiplexes the data such as video data and audio data output from plural kinds of media, and the transmitter 1d adds a preamble PA including carrier and clock recovery sequence (CCA), unique word (UW), control information (CI), and etc. to the multiplexed data DT, as shown in FIG. 12. The transmitter 1d then modulates the multiplexed data by, for example, quadrature phase shift keying (QPSK) and transmits it from the transmission antenna 1e at a predetermined time slot.

In the receiving station, the reference numeral $2_a$ represents a reception antenna, 2b a demodulator, 2c a demultiplexer, 4 an image receptor such a TV and 5 an audio unit.

The demodulator 2b demodulates the signal received by the antenna 2a into the data. The demultiplexer 2c separates the received data into the data for each information medium and inputs the video data to the image receptor 4 and the audio data to the audio unit 5.

In FIG. 11, only one transmitting station is shown, but a channel of the same satellite transponder 3 is generally used by a multiplicity of transmitting stations by using time-sharing technique and the data from the desired transmitting station is extracted by the corresponding receiving station. In this case, the transmitter 1d at each transmitting station adds a preamble to the multiplexed data after the compression of the time axis thereof, then performs phase modulation and transmits the modulated signal from the transmission antenna 1e at the determined time slot within a TDMA frame. Thereafter, each transmitting station intermittently transmits the signal by using a carrier of a burst mode at every predetermined interval of time. In this way, a multiplicity of transmitting stations use the same satellite transponder 3 by using time-sharing technique.

In the above-described multimedia broadcast communication system, if the communication network quality is deteriorated (for example, in the case of a satellite link, if the C/N is degenerated due to rainfall), the image on the image receptor 4 is disturbed, or it is difficult, or sometimes impossible to hear the audio signal output from the audio unit 5. In such a case, some output control by the receiving apparatus at the receiving station is required. For example, the receiving apparatus stops outputting a video signal and an audio signal to the terminals (e.g., the image receptor and the audio unit), or holds the state of the preceding screen so as to display it, or displays a fixed screen.

FIG. 13 shows the structure of a receiving apparatus which explains the conventional output control executed when the communication network quality is deteriorated. The same numerals are provided for the elements which are the same as those shown in FIG. 11.

The reference numeral 2 represents a receiving apparatus, 2a a reception antenna, 2b a demodulator for demodulating data from a received signal by extracting a reference carrier which is necessary for synchronous detection and a clock which is necessary for the reproduction of a code by using the CCR (carrier and clock recovery sequence), 2c a demultiplexer for separating the received data into the data for each medium, and 2d an output controller. The output controller 2d outputs video data, audio data and other media data to the corresponding terminals, and stops outputting data when the communication network quality is deteriorated. The reference numeral 2e represents a UW detector for detecting a unique word UW (having a bit pattern of a predetermined length) from demodulated data, 2f a synchronizer for outputting a pulse $P_{uw}$ (see FIG. 14) for defining the head of the unique word UW and, when no unique words UW is detected, inputting a data stop signal DSP to the output controller 2d, and 2g a timing signal producer for outputting timing signals VDS, ADS (see FIG. 14) which attain high levels during the data acquisition periods of the respective media.

When the communication line quality is good, the unique word UW is detected by the UW detector 2e, and the timing signal producer 2g outputs the timing signals VDS, ADS to the respective media. The demultiplexer 2c outputs demodulated video data to a line $L_v$ when the timing signal VDS has a high level, and the output controller 2d inputs the video data to the image receptor 4. The demultiplexer 2c outputs demodulated audio data to a line $L_a$ when the timing signal ADS has a high level, and the output controller 2d inputs the audio data to the audio unit 5. Similarly, other media data are input to the corresponding terminals.

On the other hand, if the communication network has some trouble and cannot detect the unique word UW and, hence, synchronous reception is impossible, the synchronizer 2f inputs the data stop signal DSP to the output controller 2d. The output controller 2d then stops outputting video data, audio data, etc. to the corresponding terminals.

In this system the data stop signal DSP is not supplied unless the communication line quality is considerably bad. However, signals on some media are often disturbed or become difficult to hear even if the communication line quality is not so bad as to supply the data stop signal DSP. As a result, in the conventional received signal output control system, even if signals are disturbed or become difficult to hear, they are not stopped outputting, and it is not until the communication line quality is deteriorated so much as to make it impossible to display an image on the screen or to hear sound that the signals are stopped outputting. It cannot therefore be said that the output control effectively functions in this system. That is, in the conventional system for stopping outputting signals only on the basis of the result of UW detection, there is a problem that when the communication line quality is deteriorated to a certain degree, it is impossible to use some media.

SUMMARY OF THE INVENTION

Accordingly, it is a first object of the present invention to eliminate the above-described problems in the related art and to stop outputting signals when the communication line quality is deteriorated to such a degree as to disturb signals and make sound difficult to hear even if synchronous reception is possible.

It is a second object of the present invention to individually control the output of reception data for each medium. In other words, it is a second object of the present invention to set a standard for stopping the output of signals for each medium and to stop outputting received data only to a medium when signals are disturbed or sound becomes difficult to hear in that medium.

It is a third object of the present invention to uniformly control the output of received data to all media so as to simplify the structure of a receiving apparatus.

It is a fourth object of the present invention to execute output control in accordance with not the result of the detection of the unique word UW but the result of the estimation of the communication line quality thereby realizing more appropriate output control in accordance with a medium.

To achieve these aims, in a first aspect of the present invention, there is provided a method of outputting a received signal in multimedia communication in which a transmitting apparatus multiplexes plural kinds of information such as a video signal, an audio signal, etc. and transmits the multiplexed information through one line, and in which a receiving apparatus separates the multiplexed information and outputs the separated information to predetermined external terminals, the method comprising the steps of: demodulating a received signal and separating the data obtained by the demodulation into the data for each medium; detecting a synchronous word contained in the signal format of at least one medium; and individually controlling the output of the separated data to the external terminal of each medium on the basis of the state in which the synchronous word is detected.

In a second aspect of the present invention, there is provided a method of outputting a received signal in multimedia communication in which a transmitting apparatus subjects plural kinds of information such as a video signal, an audio signal, etc. to an error-correction encoding processing, multiplexes the data obtained by the error-correction encoding processing, and transmits the multiplexed information through one line, and in which a receiving apparatus separates the multiplexed information and outputs the separated information to predetermined external terminals, the method comprising the steps of: demodulating the received signal and subjecting the data obtained by the demodulation to an error-correction decoding processing; subjecting the data obtained by the error-correction decoding processing to an error-correction encoding processing; estimating the quality of the line by comparing the data obtained by the error-correction encoding processing with the demodulated data before decoding; and controlling the output of a received signal to the external terminal of each medium on the basis of the result of the estimation of the line quality.

Other features and advantages of the present invention will be apparent from the following description taken in conjunction with the accompanying drawings.

BRIEF DESCRIPTION OF THE DRAWINGS

DESCRIPTION OF THE PREFERRED EMBODIMENTS (A) Schematic structure of the invention FIGS. 1A and 1B are schematic explanatory views of the structure of the present invention. The reference numeral 11 represents a reception antenna, 12 a demodulator, 13 a demultiplexer for separating demodulated time-division multiplexed data into data for each medium, 17a a synchronous word detection state monitor for monitoring the state in which the synchronous word contained in a signal format of a predetermined information medium is detected; and 17c, 18c output controllers for controlling the output of information data to external terminals on the basis of the state in which the synchronous word is detected. The reference numeral 21 represents an error-correction decoder for subjecting the demodulated received data to an error-correction decoding processing, 22 an error-correction encoder for subjecting the data obtained by the error-correction decoding processing to an error-correction encoding processing, and 23 a line quality estimating portion for estimating the line quality by comparing the data obtained by the error-correction encoding processing with the demodulated data before decoding.

(a) Schematic structure of first embodiment

Figure 1A:
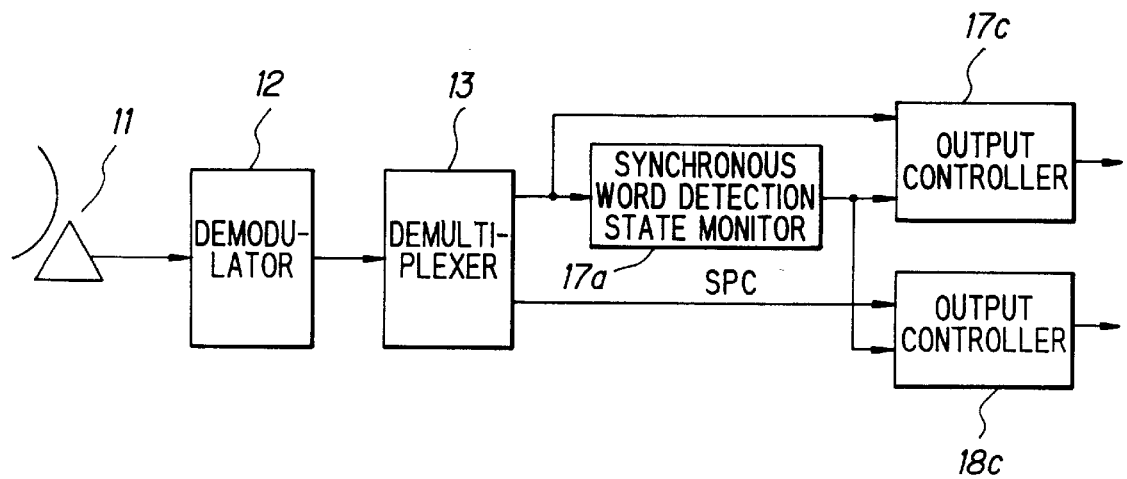
FIGS. 1A and 1B are schematic explanatory views of the structure of the present invention.

The transmitting apparatus multiplexes plural kinds of information such as a video signal, an audio signal, etc. and transmits the multiplexed information through a line, and the receiving apparatus separates the multiplexed information and outputs the separated information to predetermined external terminals. The demultiplexer 13 (FIG. 1A) separates the demodulated multiplexed data into the data for each information medium. The synchronous word detection state monitor 17a monitors the state in which the synchronous word contained in a signal format of a predetermined information medium is detected and outputs an output stop signal SPC when the synchronous word detection state is worse than the preset standard. Each of the output controllers 17c, 18c uniformly stops the output of the separated data to the external terminals of all the information media in accordance with the output stop signal SPC.

In this way, when signals are disturbed or become difficult to hear due to the deterioration of the communication line quality, it is possible to stop outputting the received signal even if the unique word UW indicating synchronous reception is detected. In addition, since provision of only one synchronous word detection state monitor in common to each medium suffices, it is possible to simplify the structure of the receiving apparatus. If a synchronous word detection state monitor is provided in each medium, it is possible to set the standard for stopping the output of signals for each medium and therefore to stop outputting received data only to a medium when signals are disturbed or sound becomes difficult to hear in that medium.

(b) Schematic structure of second embodiment

Figure 1B:
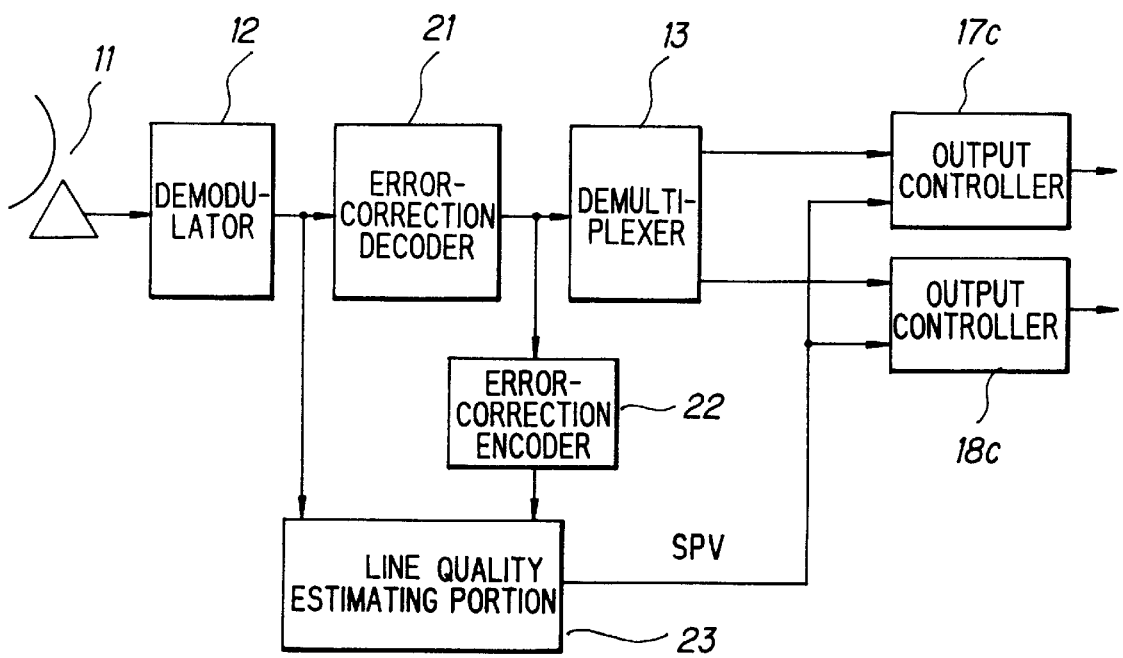

In a second embodiment of the present invention, the error-correction decoder 21 (FIG. 1B) subjects the demodulated data to an error-correction decoding processing, and the error-correction encoder 22 subjects the data obtained by the error-correction decoding processing to an error-correction encoding processing. The line quality estimating portion 23 estimates the line quality by comparing the data obtained by the error-correction encoding processing with the demodulated data before decoding, and when the line quality is worse than the reference quality, the line quality estimating portion 23 supplies an output stop signal SPV to the output controllers 17c and 18c. Each of the output controllers 17c, 18c uniformly stops the output of the separated data to the external terminals of all the information media in accordance with the output stop signal SPV.

In this way, when signals are disturbed or become difficult to hear due to a certain degree of deterioration of the communication line quality, it is possible to stop outputting the received signal even if the unique word UW indicating synchronous reception is detected. In addition, since provision of only one comparator for comparing the result of the estimation of the line quality with the reference quality in common to each medium suffices, it is possible to simplify the structure of the receiving apparatus. If a comparator for comparing the result of the estimation of the line quality with the reference quality is provided in each medium and the reference quality is changed for each medium, individual output control for each medium is possible. It is therefore possible to stop outputting received data only to a medium when signals are disturbed or sound becomes difficult to hear in that medium.

In addition, both the synchronous word detection state monitor 17a and the line quality estimating portion 23 may be provided so as to uniformly or individually stop outputting the received data to the external terminals when the synchronous word detection state is worse than the preset standard or when the line quality is worse than the reference quality. In this way, when signals are disturbed or become difficult to hear due to the deterioration of the communication line quality, it is possible to stop outputting the received signal uniformly to all the media or individually to the corresponding medium.

(B) First embodiment of the invention (a) Entire structure

Figure 2:
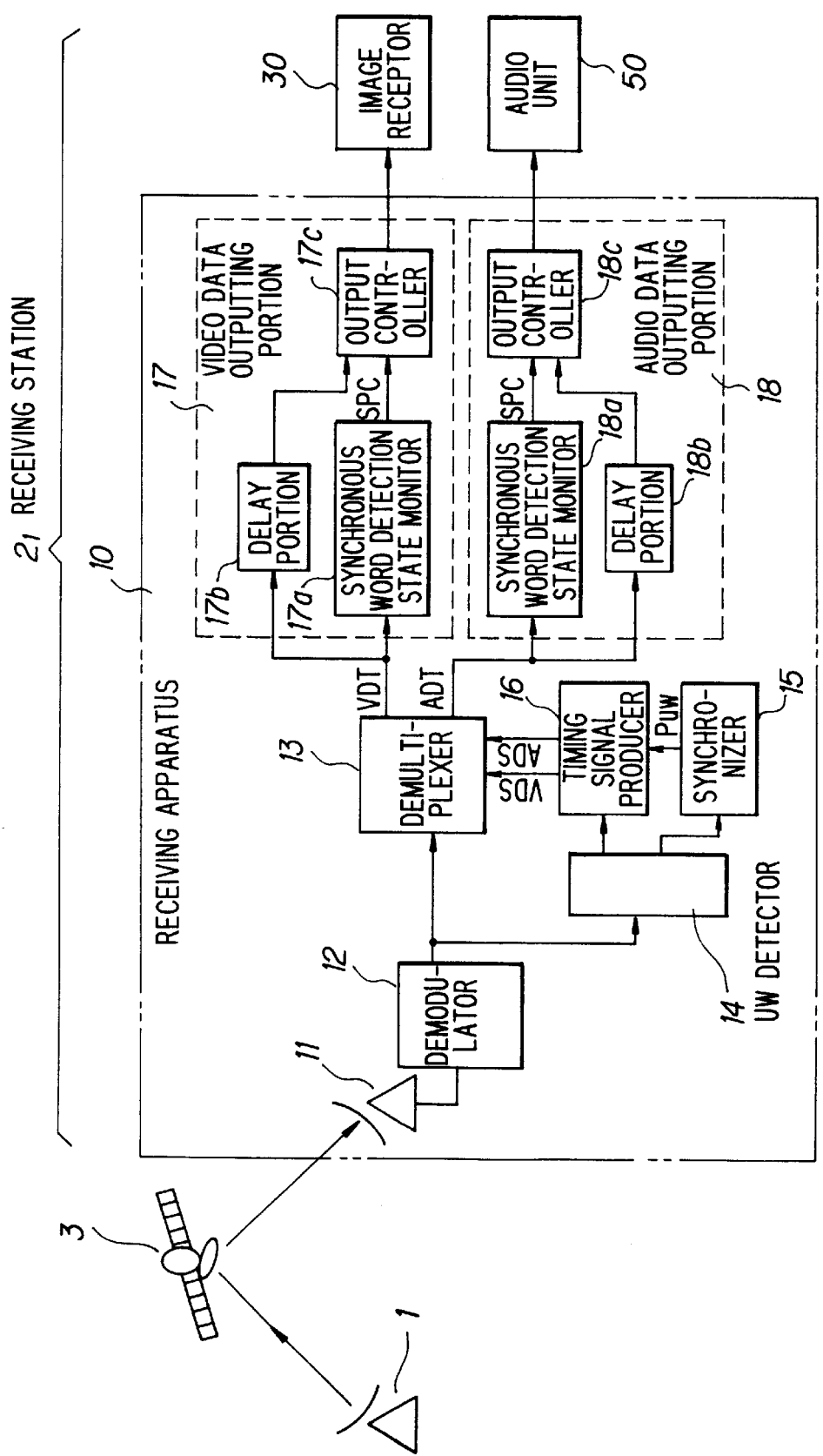
FIG. 2 shows the structure of a first embodiment of the present invention.

FIG. 2 shows the structure of a first embodiment of the present invention. In FIG. 2, the reference numeral 1 represents a transmitting station, 2_1 receiving stations and 3 a satellite transponder. In the receiving station $2_1$, the reference numeral 10 represents a receiving apparatus, 30 an image receptor, and 50 an audio unit.

In the receiving apparatus 10, the reference numeral 11 represents a reception antenna, 12 a demodulator for demodulating the data from the received signal, 13 a demultiplexer for separating the demodulated data into the data (e.g., video data and audio data) for each information medium, 14 a UW detector for detecting a unique word UW from the demodulated data, 15 a synchronizer for outputting a pulse $P_{uw}$ for defining the head of the unique word UW and, 16 a timing signal producer for outputting timing signals VDS, ADS, . . . which have high levels during the data acquisition periods of the respective media.

The reference numeral 17 represents a video data outputting portion, 17a a synchronous word detection state monitor for monitoring the state in which the synchronous word provided at the head of video data VDT is detected, 17b a delay portion for delaying the video data VDT by the time required for monitoring the synchronous word detection state, and 17c an output controller for controlling the output of video data VDT to the image receptor 30 on the basis of the state in which the synchronous word is detected. The reference numeral 18 represents an audio data outputting portion, 18a a represents a synchronous word detection state monitor for monitoring the state in which the synchronous word provided at the head of audio data ADT is detected, 18b a delay portion for delaying the audio data ADT by the time required for monitoring the synchronous word detection state, and 18c an output controller for controlling the output of audio data ADT to the audio unit 50 on the basis of the state in which the synchronous word is detected. In this embodiment, attention is paid to the synchronous word which is positioned at the head of the information data for each medium and which has a higher possibility of not being detected when the network quality is deteriorated than the unique word UW.

(b) Synchronous word detection state monitor

Figure 3:
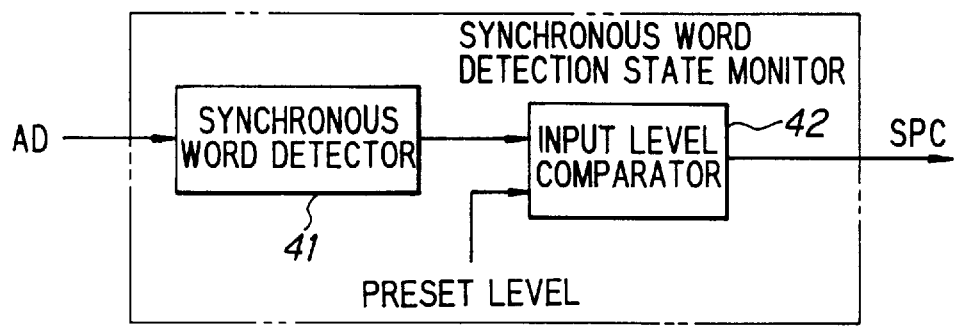
FIG. 3 is an explanatory view of the structure of a synchronous word detection state monitor.
Figure 4:
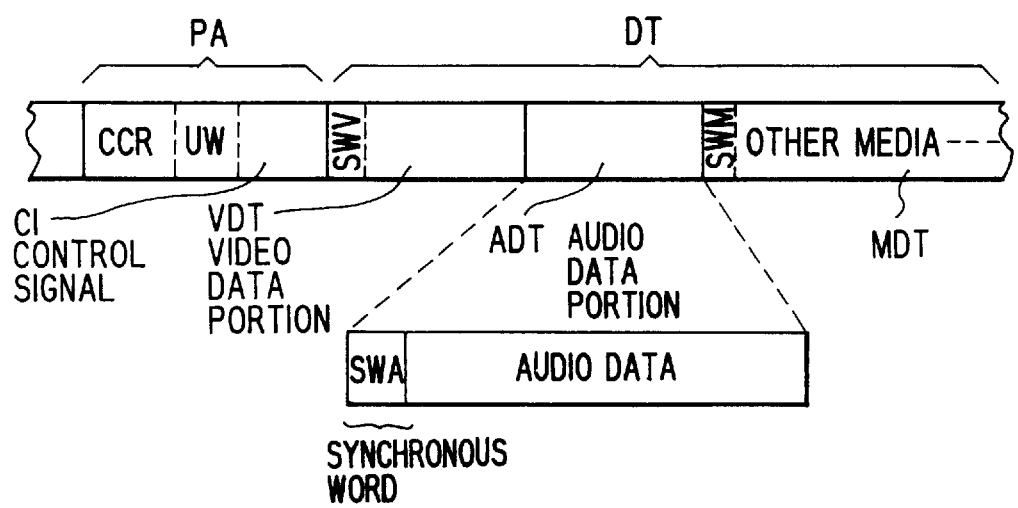
FIG. 4 is an explanatory view of a signal format.

FIG. 3 shows the structure of a synchronous word detection state monitor, and FIG. 4 is an explanatory view of a signal format supplied from the transmitting station.

The video transmitting station 1 (FIG. 2) attaches a forward error correction code (FEC) to digital video data and audio data, multiplexes the data for each medium by using time-sharing technique, adds a preamble PA including carrier and clock recovery sequence (CCA), unique word (UW) and control information (CI) to the multiplexed data DT, modulates the multiplexed data by, for example, quadrature phase shift keying (QPSK modulation) and then transmits the modulated data from the transmission antenna. The received signal therefore has the structure shown in FIG. 4. Synchronous words SWV, SWA and SWM for correctly reproducing the continuous data are provided at the head of the video data portion VDT, the audio data portion ADT and other media data portions MDT, respectively.

As shown in FIG. 3, each of the synchronous word detection state monitors 17a, 18a is provided with a synchronous word detector 41 for detecting the synchronous word for each medium and outputting a signal corresponding to the detection state, and an input level comparator 42 for comparing the signal level showing the synchronous word detection state with a preset value, judging that the communication line quality is deteriorated when the set value is larger and outputting an output stop signal SPC.

For example, if the synchronous word detection state monitor shown in FIG. 3 is the synchronous word detection state monitor 18a in the audio data outputting portion 18, when the synchronous word detector 41 detects the synchronous word SWA, it outputs a signal of a high level while outputting a signal of a low level when the synchronous word SWA is not detected. The input level comparator 42 compares the signal level with the preset level, and when the preset level is higher, the input level comparator 42 outputs the output stop signal SPC to the output controller 18c provided at the next stage. In this way, when the communication network quality is deteriorated and the synchronous word is not detected, the output of an audio signal to the audio unit is immediately stopped, thereby preventing offensive noise from being output. In this case, once the synchronous word is not detected, the output stop signal SPC is immediately output. Alternatively, the synchronous word detection state monitor may have a structure for producing the output stop signal SPC when the number of synchronous words which are not detected in a predetermined period reaches a predetermined number. For example, when the synchronous word is not detected, the signal level may be lowered with a comparatively large step. On the other hand, when the synchronous word is detected, the signal level may be raised with a comparatively large step, and when the signal level falls below the preset value, the output stop signal SPC may be produced. In this way, it is possible to set the value for each medium, so that the optimal output control corresponding to each information medium is possible.

(c) Operation of the first embodiment as a whole (c-1) When the communication line quality is good:

The demodulator 12 extracts a reference carrier which is necessary for synchronous detection and a clock which is necessary for reproduction of a code by using the CCR contained in a received signal, demodulates the data from the received signal by using the extracted reference carrier and clock, and inputs the demodulated data to the demultiplexer 13 and the UW detector 14. The UW detector 14 detects the unique word UW, the synchronizer 15 produces the pulse $P_{uw}$ for defining the head of the unique word UW, and the timing signal producer 16 outputs a timing signal for each medium. The timing signal producer 16 outputs a timing signal VDS which attains a high level in the period of the video data portion VDT (see FIG. 4) and a timing signal ADS which attains a high level in the period of the audio data portion ADT.

The demultiplexer 13 outputs video data VDT to the video data outputting portion 17 when the timing signal VDS is on a high level, and outputs audio data ADT to the audio data outputting portion 18 when the timing signal ADS is on a high level.

The synchronous word detection state monitors 17a, 18a monitor the state in which the synchronous words SWV, SWA provided at the head of the video data VDT and the audio data ADT, respectively are detected. In this case, since the communication line quality is good, the synchronous words SWV, SWA are correctly detected, so that the synchronous word detection state monitors 17a, 18a do not output the output stop signal SPC. The output controllers 17c, 18c therefore input the video data and the audio data output from the delay portions 17b and 18b to the video receptor 30 and the audio unit 50, respectively, which display the image on the display screen and output the sound from the speaker, respectively.

(c-2) When the communication line quality is deteriorated:

When the communication line quality is deteriorated, the synchronous word is not detected in some media. When the number of synchronous words which are not detected in the synchronous word detection state monitor 17a of the video data outputting portion 17 in a predetermined period reaches the preset value, the synchronous word detection state monitor 17a outputs the output stop signal SPC to the output controller 17c, which immediately stops outputting the video data to the image receptor 30.

When the number of synchronous words which are not detected in the synchronous word detection state monitor 18a of the audio data outputting portion 18 in a predetermined time reaches the preset value, the synchronous word detection state monitor 18a outputs the output stop signal SPC to the output controller 18c, which immediately stops outputting the audio data to the audio unit 50.

In this case, it is possible to individually stop the outputs by setting the optimum values for the image receptor 30 and the audio unit 50, respectively.

In this way, it is possible to individually stop outputting the received signal to a medium when the communication line quality is deteriorated to such an extent as to disturb signals or make sound difficult to hear even if the unique word UW indicating synchronous reception is detected. Therefore, when the image is disturbed, only the video signal is stopped outputting, while when the sound is difficult to hear, only the audio signal is stopped outputting. When both the image and the sound are disturbed, both the video signal and the sound signal are stopped outputting.

The receiving apparatus 10 may have a structure for displaying the fixed image prepared in advance or holding the preceding screen so as to display it when the apparatus 10 stops outputting the video signal.

(d) Modification of the first embodiment

In the first embodiment shown in FIG. 2, the synchronous word detection state monitor is provided for each medium. Alternatively, it is possible to provided the synchronous word detection state monitor only for one medium so as to stop outputting the received signal to all the media when the number of synchronous words which are not detected reaches the preset value.

It is also possible to provide a synchronous word detection state monitor only for one medium and to set the reference value for outputting the output stop signal SPC for each medium, thereby when the number of synchronous words which are not detected reaches the reference value for each medium the output stop signal SPC is supplied to the corresponding output controller.

Figure 5:
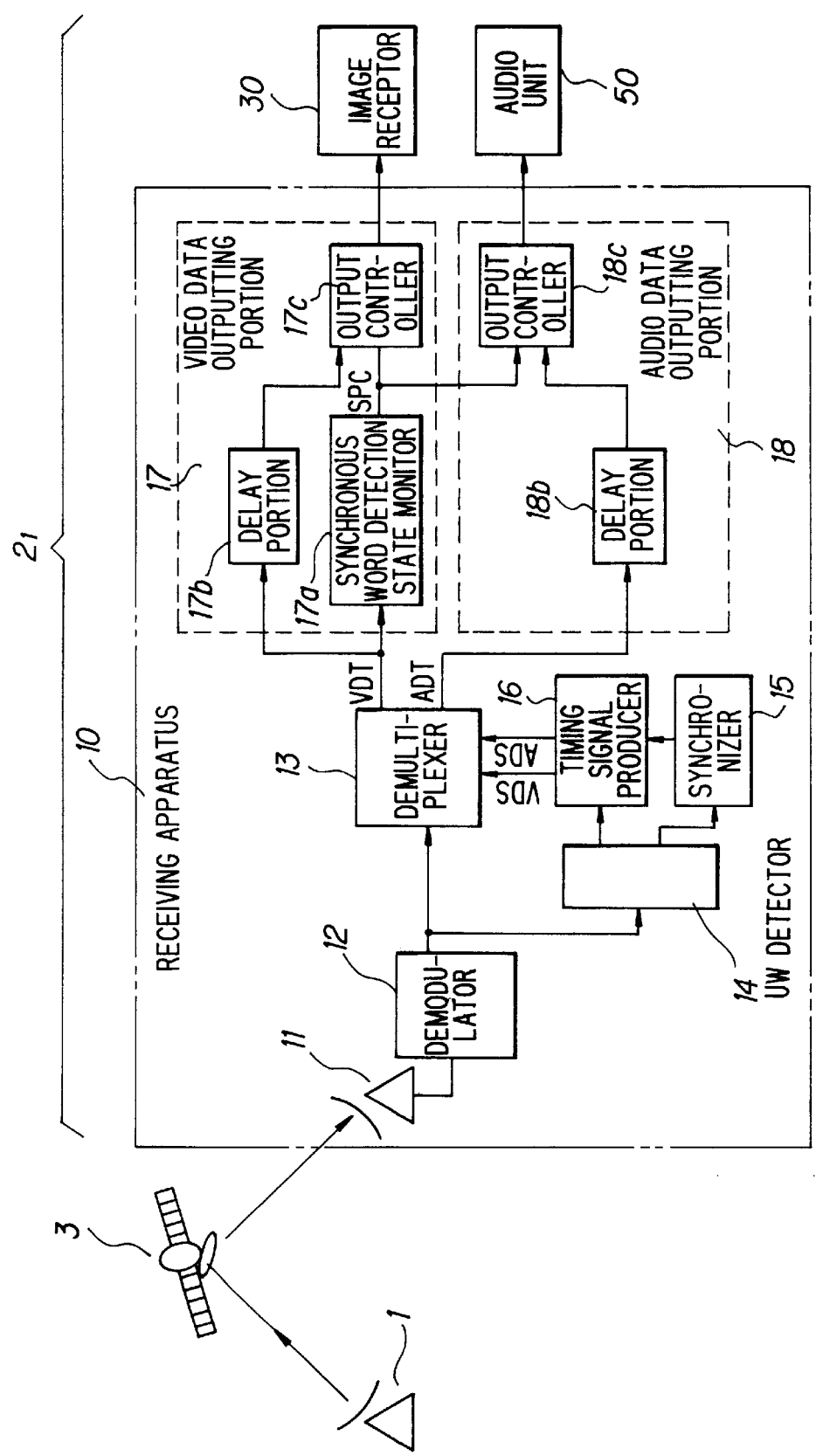
FIG. 5 shows the structure of a modification of the first embodiment.

FIG. 5 shows the structure of a modification of the first embodiment. The synchronous word detection state monitor 18a of the audio data outputting portion 18 provided in the first embodiment is omitted in this modification and the received signal is stopped outputting to the external terminals of all media in accordance with the output stop signal SPC supplied from the synchronous word detection state monitor 17a of the video data outputting portion 17. The same reference numerals are provided for the elements which are the same as those shown in FIG. 2.

(C) Second embodiment of the invention (a) Structure

Figure 6:
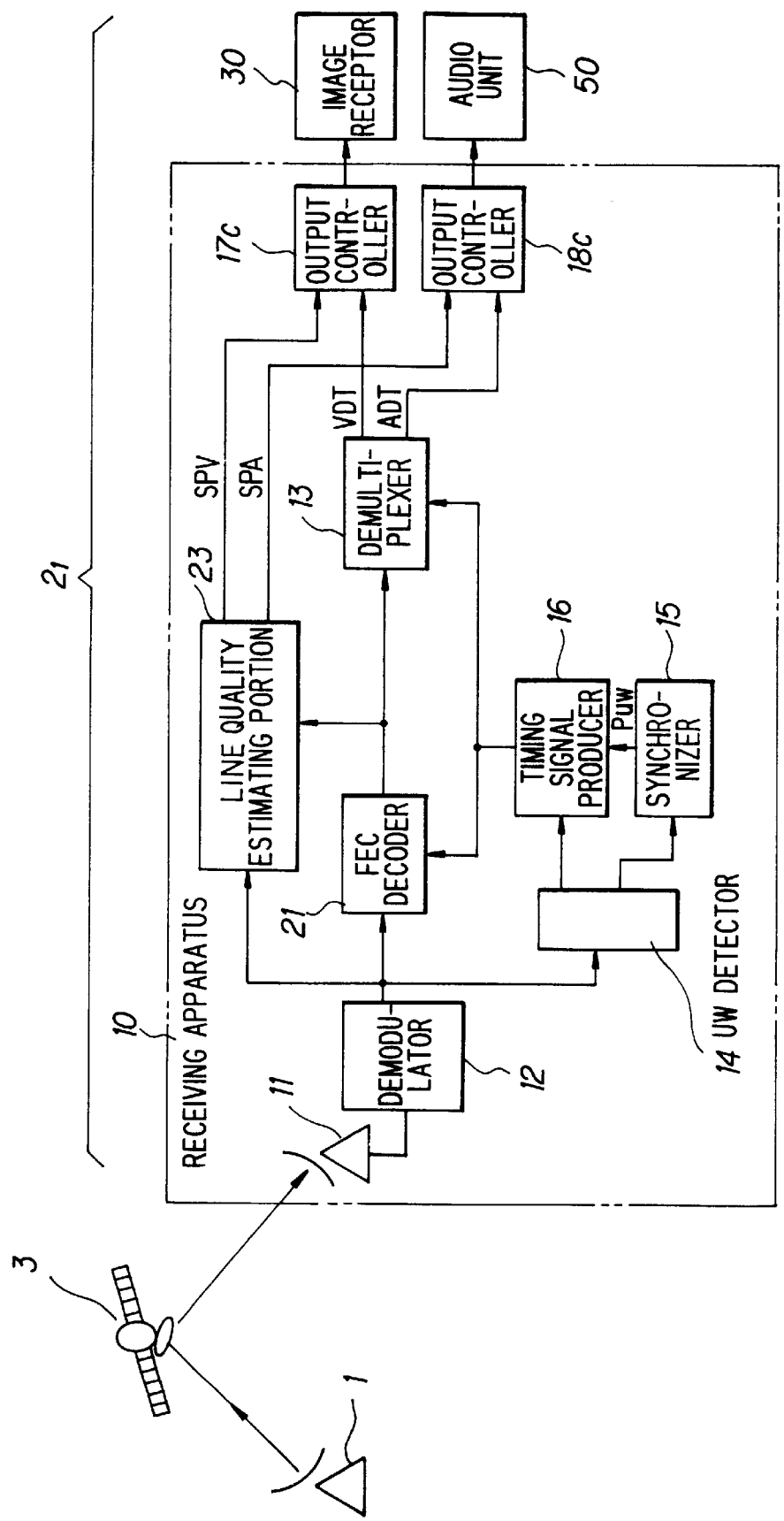
FIG. 6 shows the structure of a second embodiment of the present invention.

FIG. 6 shows the structure of a second embodiment of the present invention. The same reference numerals are provided for the elements which are the same as those of the first embodiment shown in FIG. 2. The reference numeral 21 represents an FEC decoder (error-correction decoder) for subjecting the demodulated data to an error-correction decoding processing, and 23 a line quality estimating portion for subjecting the decoded data obtained by the FEC decoding processing to an FEC encoding processing (error-correction encoding processing), estimating the line quality by comparing the data obtained by the FEC encoding processing with the demodulated data before decoding, and outputting the output stop signals SPV, SPA when the communication line quality is worse than the reference quality. When the received data is decoded by the FEC decoder 21, a considerable amount of transmission error is corrected and the quality of the received data is improved. Therefore, by subjecting the decoded data to the FEC encoding processing and comparing the encoded data with the demodulated data before decoding, it is possible to count the number of transmission error bits, and by counting the number of transmission error bits, it is possible to estimate a BER (Bit Error Rate).

Figure 7:
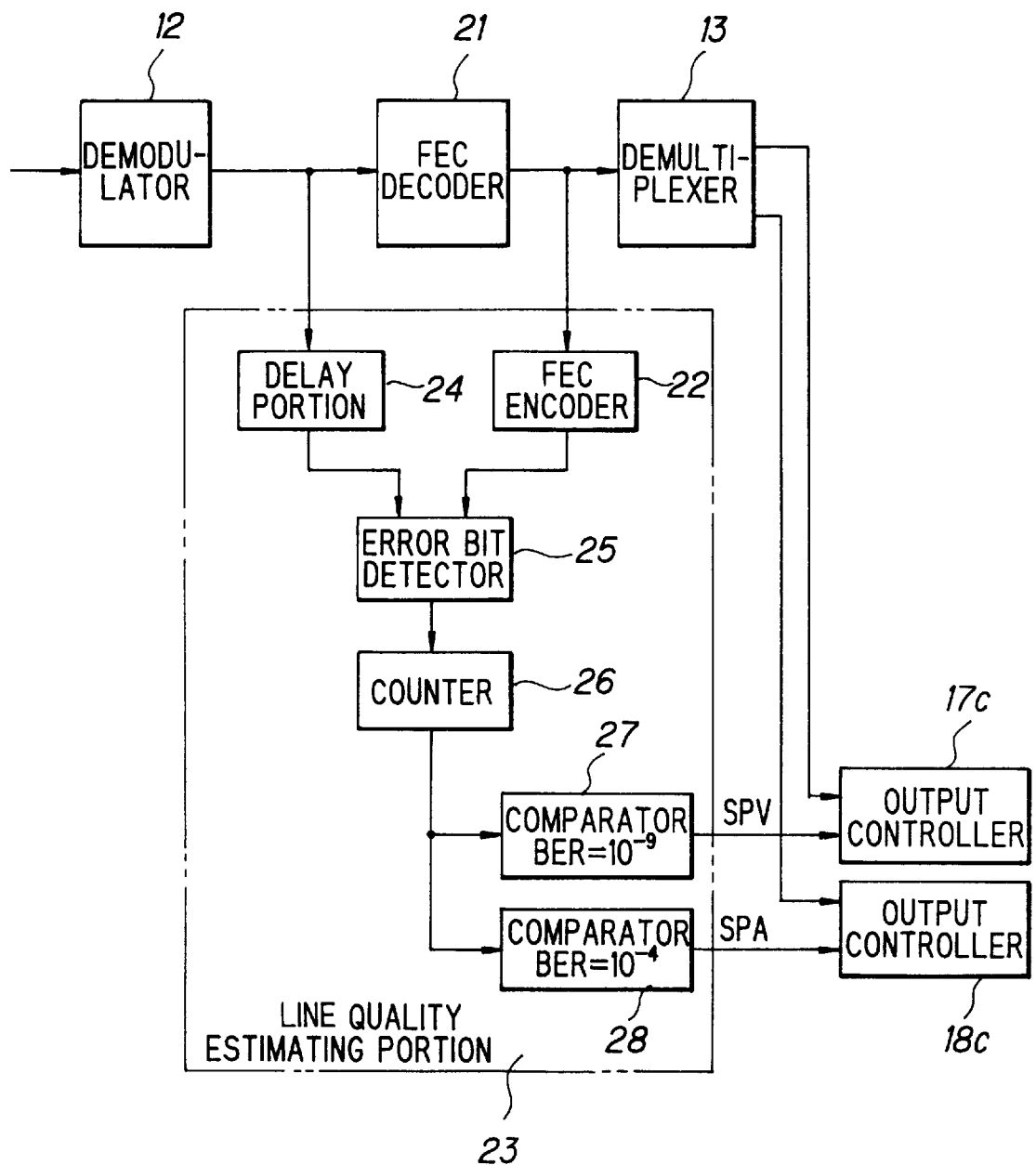
FIG. 7 shows the structure of a line quality estimating portion in the second embodiment.

FIG. 7 shows the structure of the network quality estimating portion 23. The reference numeral 22 represents an FEC encoder (error-correction encoder) for encoding the decoded data supplied from the FEC decoder, 24 a delay portion for delaying the demodulated data by the time required for the error-correction decoding processing and the error-correction encoding processing, 25 an error bit detector for detecting a pseudo bit error by comparing the data (demodulated data) before decoding with the decoded and encoded data, 26 a counter for counting the number of error bits, 27 a comparator for producing the video data output stop signal SPV when the estimated BER obtained from the count value is not less than $10^{-9}$, and 28 a comparator for producing the audio data output stop signal SPA when the estimated BER obtained from the count value is not less than $10^{-4}$ Since an image is disturbed even if the BER is small, the preset value for the quality standard is $10^{-9}$ On the other hand, since sound is audible even if the BER is comparatively large, the preset value for the quality standard is $10^{-4}$.

(b) Operation (b-1) When the communication line quality is good:

The transmitting station 1 subjects the video data and the audio data to the FEC encoding processing, multiplexes these video data and audio data by using time-sharing technique for each medium, adds a preamble PA including carrier and clock recovery sequence (CCA), unique word (UW) and control information (CI) to the multiplexed data DT, performs phase modulation by the multiplexed data and then transmits the modulated data from the transmission antenna.

The demodulator 12 demodulates the data from the signal (received signal) received by the reception antenna 11 and inputs the demodulated data to the UW detector 14, the FEC decoder 21 and the line quality estimating portion 23. The UW detector 14 detects the unique word UW, the synchronizer 15 produces the pulse $P_{uw}$ for defining the head of the unique word UW, and the timing signal producer 16 outputs a timing signal for each medium.

The FEC decoder 21 subjects the demodulated data to the FEC decoding processing and outputs the decoded data. The demultiplexer 13 separates the decoded data into the data for each medium in accordance with the timing signal, and inputs the separated data to the output controllers 17c and 18c.

The FEC encoder 22 of the line quality estimating portion 23 encodes the decoded data. The delay portion 24 delays the demodulated data by the time required for FEC decoding/encoding processing, and the error bit detector 25 compares the data (demodulated data) before decoding with the encoded data so as to detect a pseudo bit error. The counter 26 counts the number of error bits so as to calculate a pseudo (estimated) BER and inputs it to the comparators 27, 28. The comparator 27 produces the video data output stop signal SPV when the estimated BER obtained from the count value is not less than $10^{-9}$, while the comparator 28 produces the audio data output stop signal SPA when the estimated BER obtained from the count value is not less than $10^{-4}$. In this case, since the communication network quality is good, the estimated BER never exceeds $10^{-9}$ or $10^{-4}$, so that neither of the output stop signals SPV and SPA is output. The output controllers 17c, 18c input the video data and audio data output from the demultiplexer 13 to the image receptor 30 and the audio unit 50, respectively, which display the image on the display screen and output the sound from the speaker, respectively.

(b-2) When the communication line quality is deteriorated:

When the communication line quality is deteriorated, the number of error bits increases and the estimated BER exceeds $10^{-9}$. In this case, the comparator 27 outputs the output stop signal SPV. Therefore, the output controller 17c does not output the video data to the image receptor 30. As a result, no image is displayed on the screen and only the sound is output from the speaker.

When the communication line quality is further deteriorated, the number of error bits further increases to not less than $10^{-4}$. In this case, the comparator 28 outputs the output stop signal SPA. Therefore, the output controller 18c does not output the audio data to the audio unit 50. As a result, no sound is output from the speaker or no image is displayed on the screen. When the communication line quality becomes good, the output of an image and sound is resumed.

In this way, when the communication line quality is deteriorated to such an extent as to disturb signals or make sound difficult to hear even if the unique word UW indicating synchronous reception is detected, it is possible to individually stop the output of a received signal to the external terminal of each medium. Therefore, when the image is disturbed, only the video signal is stopped outputting, while when the sound is difficult to hear, only the audio signal is stopped outputting.

(c) Modification of the second embodiment

In the second embodiment shown in FIGS. 6 and 7, a comparator is provided for each medium. It is also possible to provide a comparator only for one medium so as to stop outputting the received signal to the external terminals of all media when the estimated BER exceeds the preset value.

Figure 8:
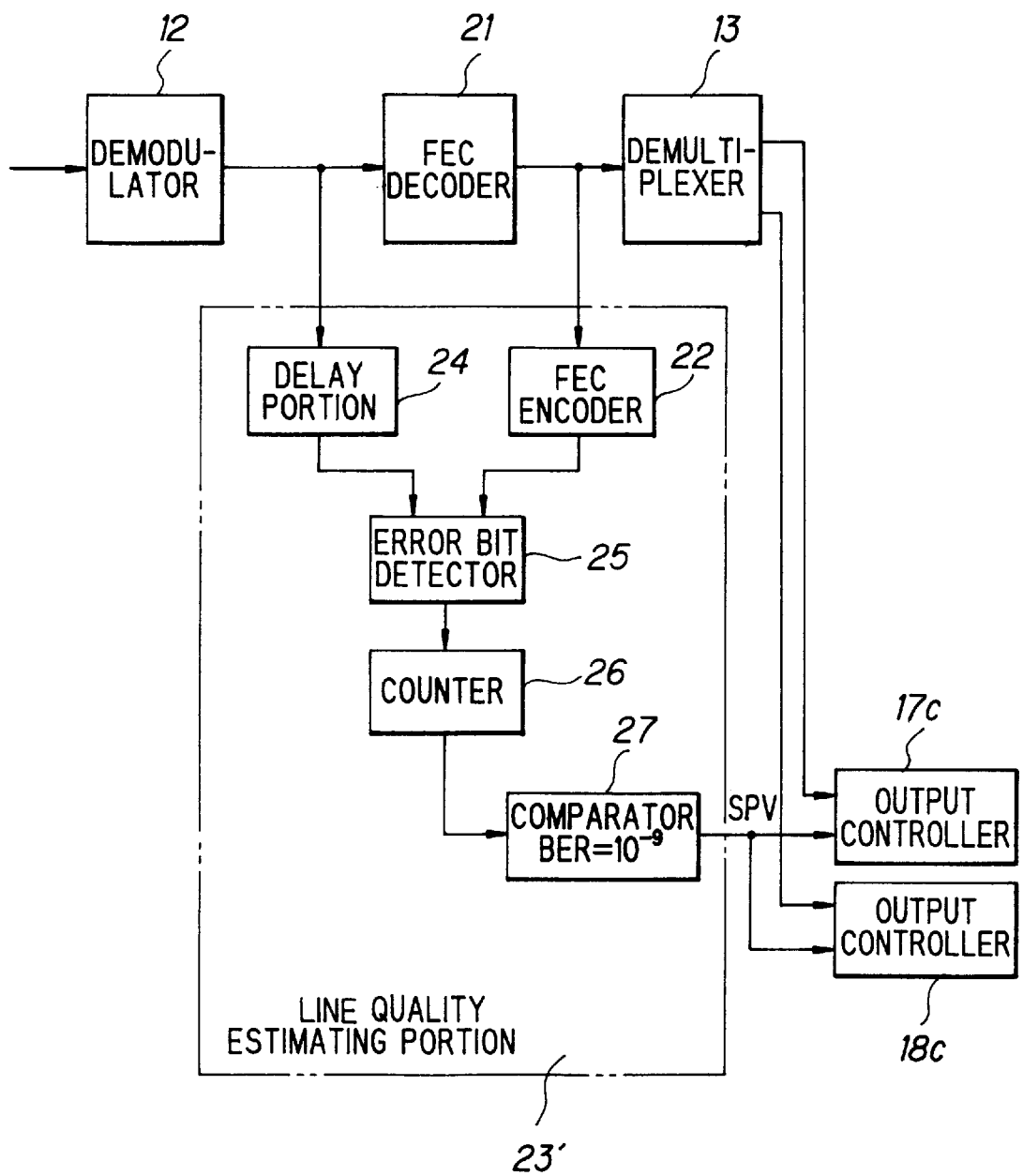
FIG. 8 shows the structure of a line quality estimating portion in a modification of the second embodiment.

FIG. 8 shows a modification of the second embodiment having such a structure. The same reference numerals are provided for the elements which are the same as those shown in FIG. 7. In a line quality estimating portion 23', only one comparator 27 is provided which outputs the output stop signal SPV so as to stop outputting the received signal to all the media when the estimated BER exceeds $10^{-9}$.

The receiving apparatus 10 may have a structure for displaying the fixed image prepared in advance or holding the preceding screen so as to display it when the apparatus stops outputting the video signal.

(D) Third embodiment of the invention

In the first embodiment, the output of a received signal is controlled in accordance with the state in which the synchronous word provided at the head of information data for each medium is detected, while in the second embodiment, the output of a received signal is controlled by estimating the deterioration of the line quality. It is possible to combine these functions so as to stop outputting a received signal when either of the conditions is satisfied.

Figure 9:
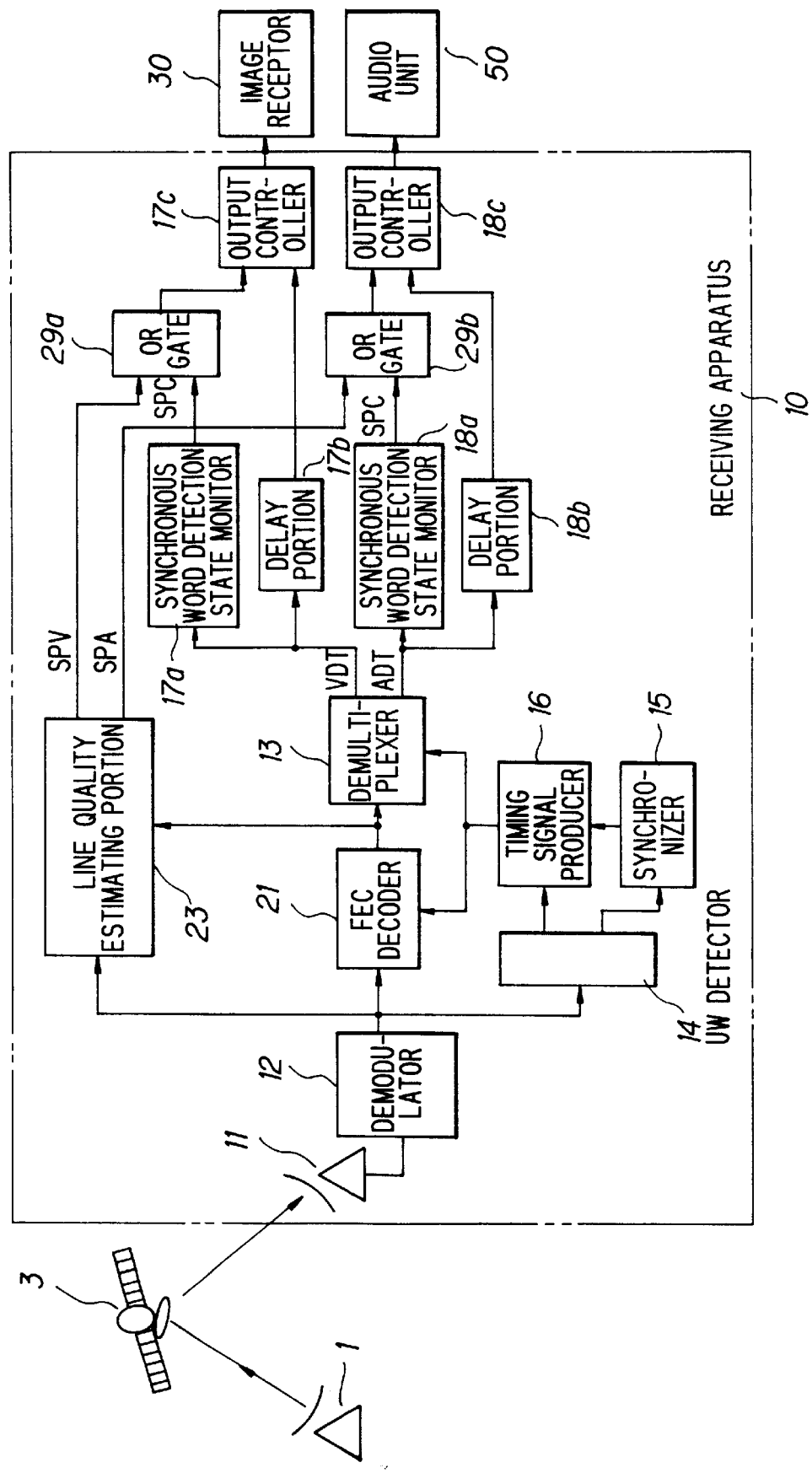
FIG. 9 shows the structure of a third embodiment of the present invention.

FIG. 9 shows the structure of a third embodiment, which is a combination of the first embodiment (FIG. 2) and the second embodiment (FIG. 6). The output of a received signal is stopped individually for each medium either when the synchronous word detection state becomes worse than the preset standard or when the estimated BER exceeds the preset value. The same reference numerals are provided for the elements which are the same as those shown in FIGS. 2 and 6. The reference numeral 29a represents an OR gate for outputting the logical sum of the output stop signal SPC which is output from the synchronous word detection state monitor 17a and the video data output stop signal SPV which is output from the line quality estimating portion 23, and 29b an OR gate for outputting the logical sum of the output stop signal SPC which is output from the synchronous word detection state monitor 18a and the audio data output stop signal SPA which is output from the line quality estimating portion 23.

The output controller 17c stops outputting video data when the output of the OR gate 29a attains a high level. The output controller 18c stops outputting audio data when the output of the OR gate 29b attains a high level.

Figure 10:
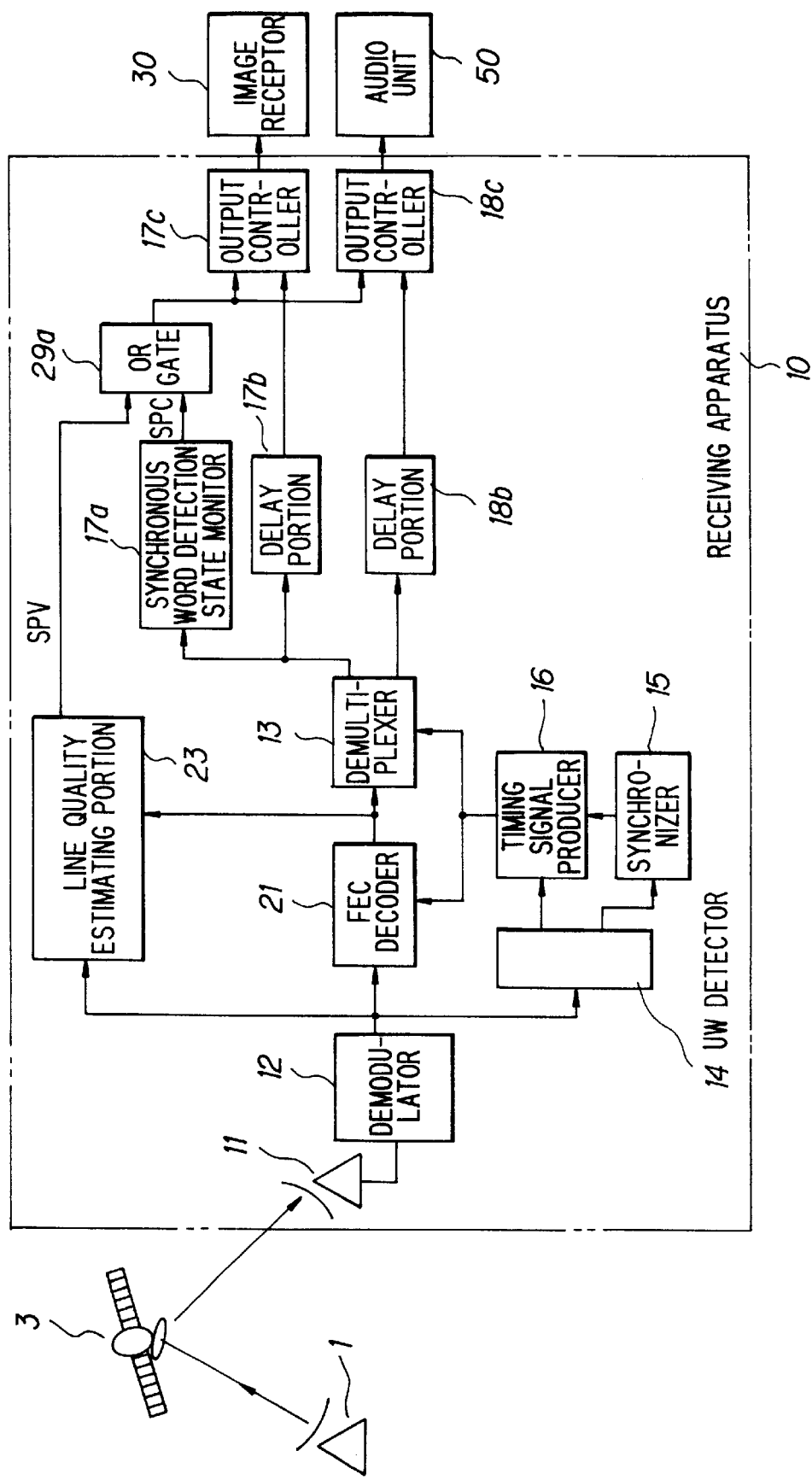
FIG. 10 shows the structure of a modification of the third embodiment.
Figure 11:
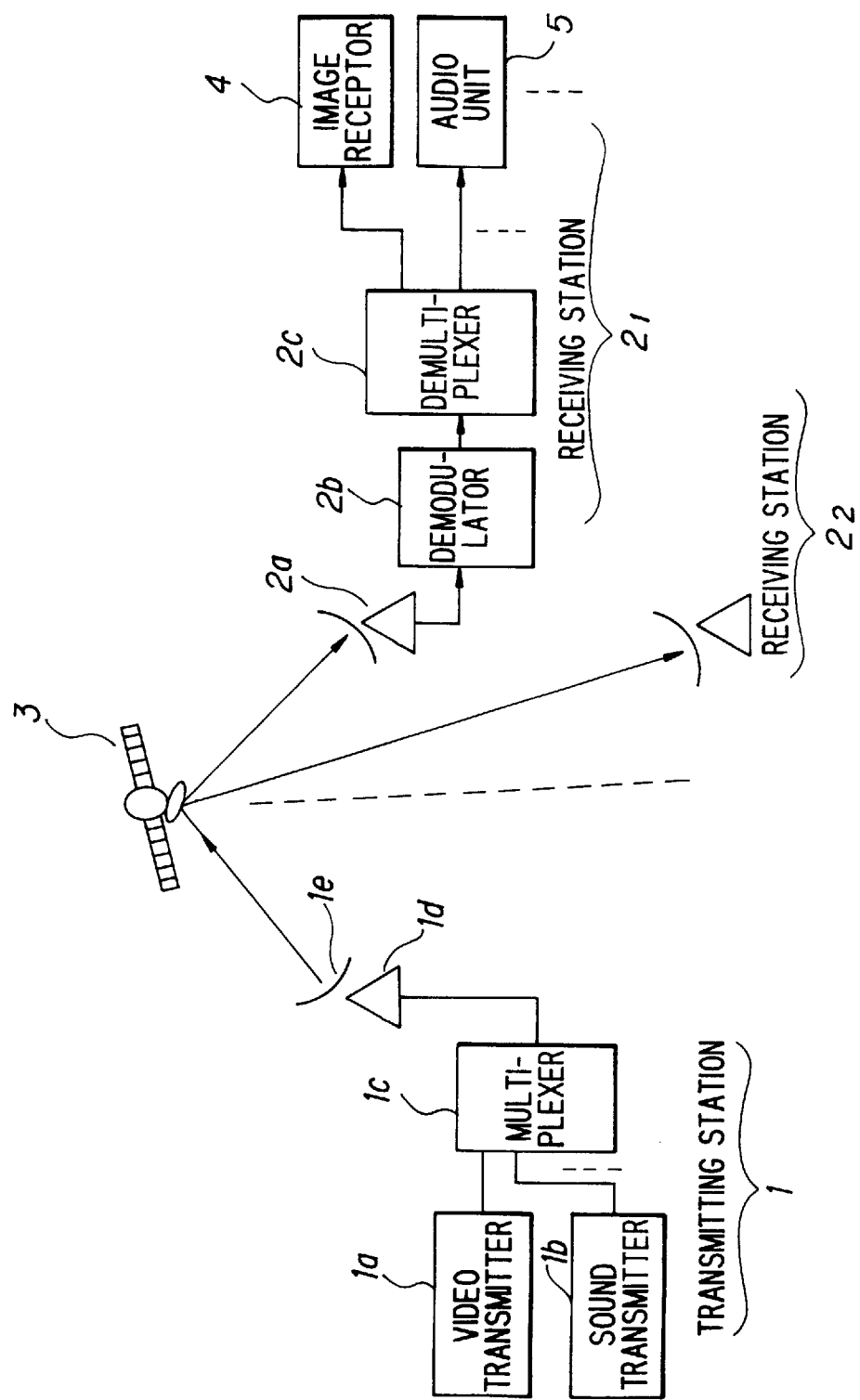
FIG. 11 shows the structure of a multimedia broadcast communication system.
Figure 12:
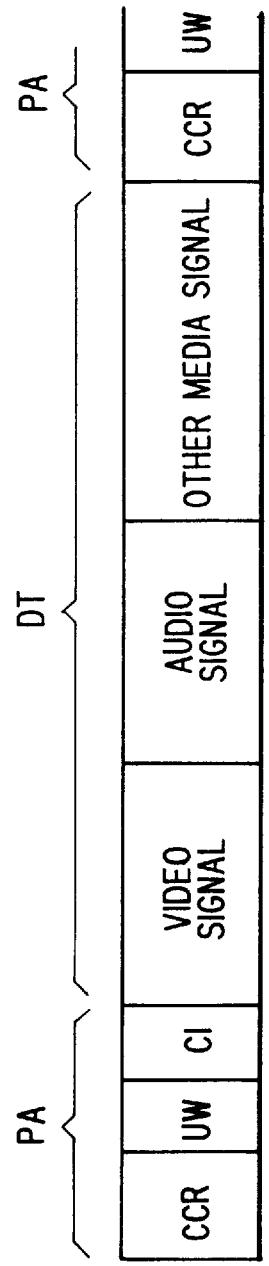
FIG. 12 is an explanatory view of a signal format.
Figure 13:
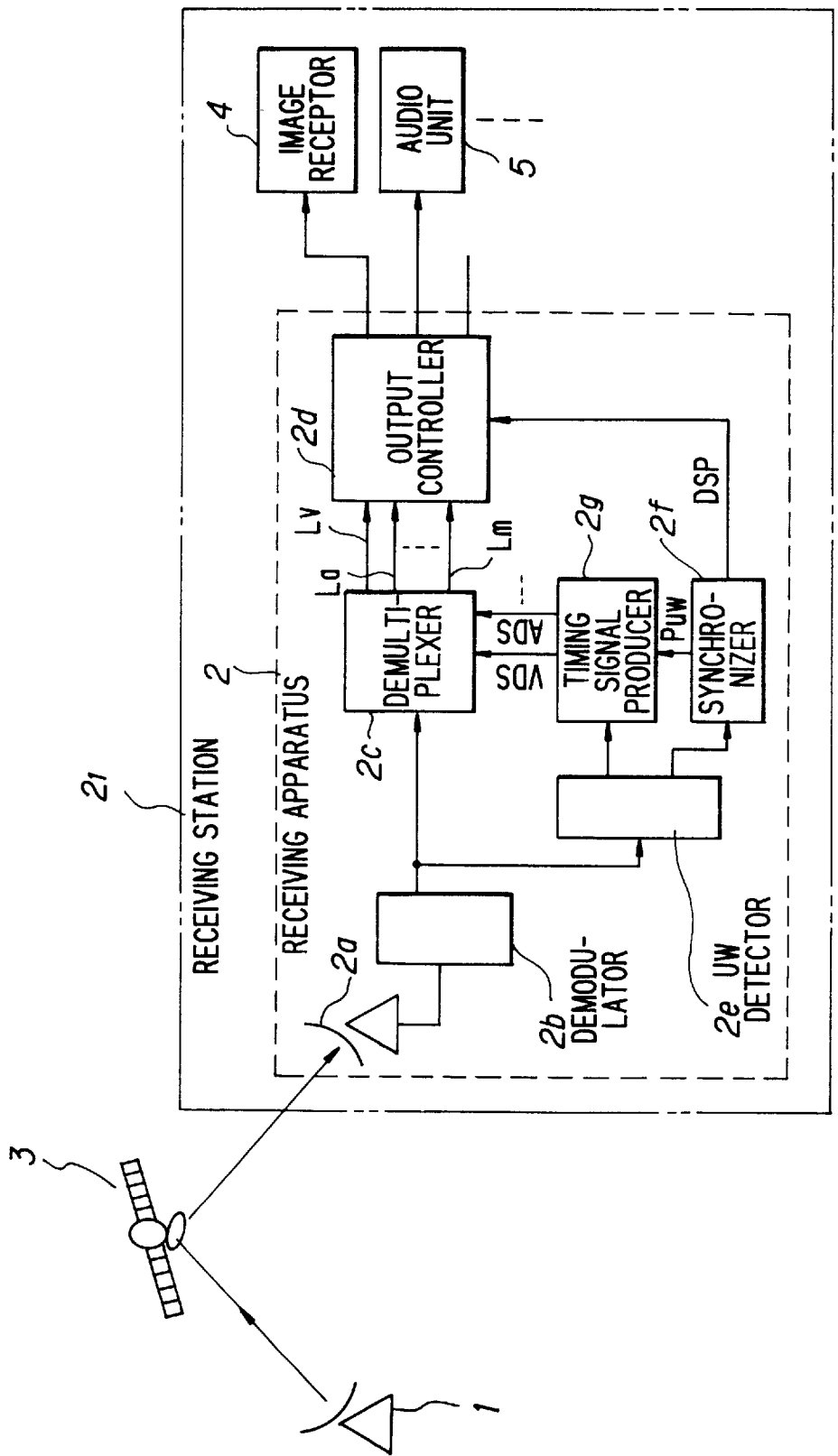
FIG. 13 shows the structure of a receiving apparatus which explains conventional output control.
Figures 14A, 14B, 14C:
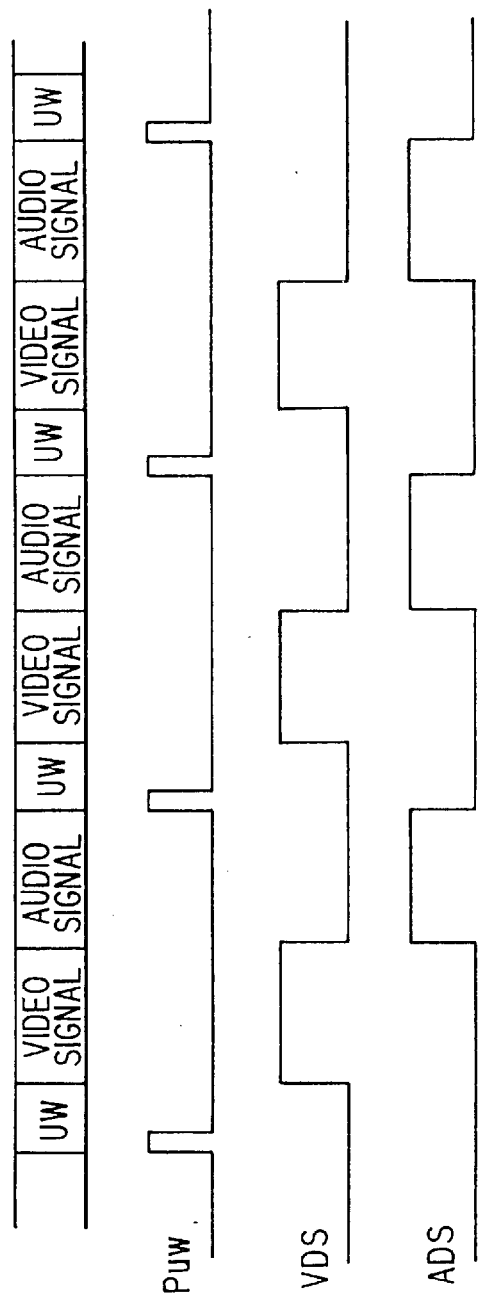
FIG. 14 is a wave form diagram which explains the operation of a receiving apparatus.

The output stop control is individually executed for each medium in the third embodiment shown in FIG. 9. Alternatively, it is possible to monitor the synchronous word detection state and the estimated BER with respect to only one medium and to stop outputting a received signal to all media either when the synchronous word detection state becomes worse than the preset standard or when the estimated BER exceeds the preset value. FIG. 10 shows a modification of the third embodiment having such a structure. The modification is a combination of the modification (FIG. 5) of the first embodiment and the modification (FIG. 8) of the second embodiment. The output of a received signal is uniformly stopped for all media either when the synchronous word detection state becomes worse than the preset standard or when the estimated BER exceeds the preset value. The same reference numerals are provided for the elements which are the same as those shown in FIGS. 5 and 8. The reference numeral 29a represents an OR gate for outputting the logical sum of the output stop signal SPC which is output from the synchronous word detection state monitor 17a and the video data output stop signal SPV which is output from the line quality estimating portion 23. The output controllers 17c and 18c stop outputting video data and audio data, respectively, when the output of the OR gate 29a attains a high level.

Although audio data and video data are explained as information data for media, the data dealt with by present invention are not restricted thereto, and the present invention is also applicable to other kinds of data such as text transmission and data communication.

As explained above, according to the present invention, time-division multiplexed data are separated into the data for each information medium, the synchronous word contained in a signal format of a predetermined information medium is detected, and when the synchronous word detection state is worse than the preset standard, the output of a received signal to the external terminals of all media is uniformly stopped. It is therefore possible to stop outputting the received signal when signals are disturbed or become difficult to hear due to the deterioration of the communication line quality even if the unique word UW indicating synchronous reception is detected.

In addition, since provision of only one synchronous word detection state monitor in common to each medium suffices, it is possible to simplify the structure of the receiving apparatus.

According to the present invention, if a synchronous word detection state monitor is provided for each medium and the reference quality is changed for each medium, individual output control for each medium is possible. It is therefore possible to stop outputting received data only to a medium when signals are disturbed or sound becomes difficult to hear in that medium.

Furthermore, according to the present invention, the demodulated data is subjected to an error-correction decoding processing, the decoded data is subjected to an error-correction encoding processing, and the data obtained by the error-correction encoding processing is compared with the demodulated data before decoding so as to estimate the line quality. When the estimated line quality is worse than the reference quality, the output of a received signal is uniformly stopped to the external terminals of all media. It is therefore possible to stop outputting the received signal when the communication line quality is deteriorated to such an extent as to disturb signals or make sound difficult to hear even if the unique word UW indicating synchronous reception is detected. In addition, since provision of only one comparator in common to each medium suffices, it is possible to simplify the structure of the receiving apparatus.

According to the present invention, if a comparator is provided for each medium and the reference quality is changed for each medium, individual output control for each medium is possible. It is therefore possible to stop outputting received data only to a medium when signals are disturbed or sound becomes difficult to hear in that medium.

According to the present invention, the output of a received signal is stopped uniformly or individually to the external terminal of each medium either when the synchronous word detection state becomes worse than the preset standard or when the estimated line quality exceeds the preset value. It is therefore possible to stop outputting the received signal uniformly or individually to each medium when the communication line quality is deteriorated to such an extent as to disturb signals or make sound difficult to hear.

As many apparently widely different embodiments of the present invention can be made without departing from the spirit and scope thereof, it is to be understood that the invention is not limited to the specific embodiment thereof except as defined in the appended claims.

What is claimed is:

1. A method of outputting a received signal in multimedia communication in which a transmitting apparatus subjects plural kinds of information including a video signal and an audio signal to an error-correction encoding processing to produce error-correction encoded data, multiplexes the error-correction encoded data, and transmits the multiplexed information through a communication line, and in which a receiving apparatus separates said multiplexed information and outputs the separated information to predetermined external terminals, said method comprising the steps of:

demodulating the received signal to produce demodulated data and subjecting the demodulated data to an error-correction decoding processing to produce error correction decoded data;

separating the error-correction decoded data into data for each information medium;

subjecting the error-correction decoded data to an error-correction encoding processing to produce error-correction encoded data;

estimating quality of the communication line by comparing the error-correction encoded data with the demodulated data before decoding;

comparing the result of the estimation of the quality of said communication line with each reference quality which is respectively set in advance for each information medium; and individually controlling an output of the separated decoded data to the predetermined external terminal of each information medium on the basis of the result of the comparison.

2. A receiving apparatus in multimedia communication in which a transmitting apparatus subjects plural kinds of information including a video signal and an audio signal to an error-correction encoding processing to produce error-correction encoded data, multiplexes the error-correction encoded data, and transmits the multiplexed information through a communication line, and in which said receiving apparatus separates said multiplexed information and outputs the separated information to predetermined external terminals, said receiving apparatus comprising:

a demodulator for modulating the received signal to produce demodulated data;

an error-correction decoder connected to the demodulator for subjecting the demodulated data to an error-correction decoding processing to produce error-correction decoded data;

a demultiplexer connected to the error-correction decoder for separating the error-correction decoded data into data for each information medium;

an error-correction encoder connected to the error-correction decoder for subjecting the error-correction decoded data to an error-correction encoding processing to produce error-correction encoded data;

a line quality estimating portion connected to the demodulator and the error-correction encoder for estimating quality of the communication line by comparing the error-correction encoded data with the demodulated data before decoding;

a comparator connected to the line quality estimating portion for comparing the result of the estimation of the quality of said communication line with each reference quality which is respectively set in advance for each information medium; and an output controller connected to the demultiplexer and the comparator for individually controlling the output of the separated decoded data to the predetermined external terminal of each information medium on the basis of the result of the comparison.

* * * * *